United States Patent
Zhao et al.

(10) Patent No.: US 7,613,701 B2
(45) Date of Patent: Nov. 3, 2009

(54) MATCHING OF COMPLEX NESTED OBJECTS BY MULTILEVEL HASHING

(75) Inventors: Ting Zhao, Coral Springs, FL (US); Kenneth L. Milsted, Boynton Beach, FL (US); Kenneth Carlin Nelson, Hollister, CA (US); Christopher T. Lehman, Delray Beach, FL (US); Qing Lu, Coral Springs, FL (US)

(73) Assignee: International Business Machines Corporation, Armonk, NY (US)

( * ) Notice: Subject to any disclaimer, the term of this patent is extended or adjusted under 35 U.S.C. 154(b) by 544 days.

(21) Appl. No.: 11/021,689

(22) Filed: Dec. 22, 2004

(65) Prior Publication Data

US 2006/0136390 A1 Jun. 22, 2006

(51) Int. Cl.
*G06F 7/00* (2006.01)
(52) U.S. Cl. ............... 707/9; 707/10; 707/101; 707/102; 713/166; 713/167; 713/176
(58) Field of Classification Search ............ 707/1, 707/9, 100–102, 104.1, 200; 713/166–167, 713/176–177, 188, 200, 201; 709/102, 238–239; 711/108
See application file for complete search history.

(56) References Cited

U.S. PATENT DOCUMENTS

| | | | | |
|---|---|---|---|---|
| 4,525,780 A * | 6/1985 | Bratt et al. | ............... | 711/163 |
| 6,023,706 A * | 2/2000 | Schmuck et al. | ............ | 707/200 |
| 6,453,419 B1 * | 9/2002 | Flint et al. | ............... | 726/3 |
| 6,594,665 B1 * | 7/2003 | Sowa et al. | ............... | 707/10 |
| 6,625,591 B1 * | 9/2003 | Vahalia et al. | ............... | 707/10 |
| 6,691,168 B1 | 2/2004 | Bal et al. | ............... | 709/238 |
| 6,754,829 B1 * | 6/2004 | Butt et al. | ............... | 726/8 |
| 6,961,809 B2 * | 11/2005 | Krishnan et al. | ............ | 711/108 |
| 7,197,597 B1 * | 3/2007 | Scheid et al. | ............... | 711/106 |
| 7,464,103 B2 * | 12/2008 | Siu et al. | ............... | 707/102 |
| 2001/0018739 A1 * | 8/2001 | Anderson et al. | ............ | 713/176 |
| 2002/0099952 A1 * | 7/2002 | Lambert et al. | ............ | 713/200 |
| 2002/0108059 A1 * | 8/2002 | Canion et al. | ............... | 713/201 |
| 2002/0174355 A1 * | 11/2002 | Rajasekaran et al. | ........ | 713/193 |
| 2003/0014466 A1 | 1/2003 | Berger et al. | ............... | 709/102 |
| 2003/0084298 A1 * | 5/2003 | Messerges et al. | .......... | 713/176 |
| 2003/0149895 A1 * | 8/2003 | Choo et al. | ............... | 713/201 |
| 2003/0187817 A1 | 10/2003 | Agrawal et al. | ............... | 707/1 |

(Continued)

OTHER PUBLICATIONS

Minami et al.—"Controlling Acess to Pervasive Information in the "Solar" System"—Dartmouth Computer Science Techniqal Report TR2002-422 Feb. 28, 2002 (pp. 1-14).*

(Continued)

*Primary Examiner*—Jean Bolte Fleurantin
*Assistant Examiner*—Anh Ly
(74) *Attorney, Agent, or Firm*—Sandra M. Parker, Esq.

(57) ABSTRACT

A computer-based method with multilevel hashing for lookup of a complex nested object (such as access control list) which has a plurality of nesting levels and each level has at least one element. Method stores representatives of a complex nested object in a data structure at locations determined by recursive multilevel hashing of the complex nested object elements. When needed, a match for an inputted complex nested object is determined by applying the same recursive multilevel hashing to the inputted complex nested object, as used during the storing of the complex nested object, and performing integer comparisons with hash values of the stored complex nested object.

18 Claims, 16 Drawing Sheets

U.S. PATENT DOCUMENTS

| | | | |
|---|---|---|---|
| 2003/0200197 A1* | 10/2003 | Long et al. .................... | 707/1 |
| 2003/0204698 A1* | 10/2003 | Sachedina et al. ........... | 711/170 |
| 2003/0225964 A1* | 12/2003 | Krishnan et al. ............ | 711/108 |
| 2004/0093517 A1* | 5/2004 | Cihula ........................ | 713/201 |
| 2004/0220975 A1* | 11/2004 | Carpentier et al. .......... | 707/200 |
| 2004/0254909 A1* | 12/2004 | Testa ............................ | 707/1 |
| 2005/0071640 A1* | 3/2005 | Sprunk et al. ............... | 713/176 |
| 2005/0086213 A1* | 4/2005 | Terao ........................... | 707/3 |
| 2005/0091261 A1* | 4/2005 | Wu et al. ..................... | 707/102 |
| 2005/0097110 A1* | 5/2005 | Nishanov et al. ............ | 707/100 |
| 2005/0235154 A1* | 10/2005 | Serret-Avila ................ | 713/176 |
| 2005/0289234 A1* | 12/2005 | Dai et al. ..................... | 709/229 |
| 2006/0074935 A1* | 4/2006 | Zimmerer .................... | 707/100 |
| 2006/0200508 A1* | 9/2006 | Telkowski et al. ........... | 707/204 |
| 2008/0046454 A1* | 2/2008 | Basu et al. .................... | 707/101 |
| 2008/0222420 A1* | 9/2008 | Serret-Avila ................ | 713/176 |

OTHER PUBLICATIONS

Andrei Z. Broder and Anna R. Karlin—"Multilevel Adaptive Hashing"—Proceedings of the first annual ACM-SIAM symposium on Discrete algorithms, San Francisco, CA USA. pp. 43-53, 1990 ISBN:0-89871-251-3.*

"Multilevel extendible hashing: a file structure for every large databases"—Du, D.H.C. and Tong, S.R.—Knowledge and data Engineering, IEEE transactions on—IEEE Sep. 1991, vol. 3, issue 3, pp. 357-370.*

"Multideimesional access methods"—Volker Gaede and Oliver Gunther—ACM Computing Surveys (CSUR) vol. 30, issue 2, ACM Jun. 1998, pp. 170-231.*

"Formalization and Correctness of Concurrent Lieanear Hash Structure Algorithm Using Nested Transactions and I/O Automata" - Madria et al. Jan. 26, 2000 (pp. 1-38) on Google.com.*

"Multilevel Extendible Hashing: a file structure for very large databases" - Du, D.H.C. & Tong, S. R. - IEEE transactions on Knowledge and Data Engineering - vol. 3, Issue 3, Sep. 1991 (pp. 357-370).*

"Multilevel Adaptive Hashing" - Andrei Z. Broder & Anna R. Karlin - Symposium on Discrete Algorithms - Proceedings of the 1st Annual ACM-SIAM Symposium on Discrete Algorithms - 1990 (pp. 43-53).*

* cited by examiner

1. Pseudocode for Initializing an Array With all Existing ACLs.

1>. create an array (A), wherein each element of array A is an empty linked list for ACLs with the same position index.
2>. for each existing ACL of the array A:
3>.     create an ACL hash (_ACL) object with array (R), wherein each element of array R is an empty linked list of rules with the same position index.
4>.     for each rule r in the linked list of rules of _ACL:
5>.         calculate the rule position index as MOD(hash(r), sizeof(R)), where hash(r) is the rule's hash value;
6>.         add rule r into the linked list of rules at position R[index].
7>.     calculate the ACL position index as MOD(hash(ACL), sizeof(A)), where hash(ACL) is the _ACL's hash value.
8>     add the _ACL into the linked list of ACL hash objects at position A[index].

FIG. 2

2. Pseudocode for Locating a Potential List of Matching ACLs for a Target ACL (acl1) in the Array A.

1>. calculate the target acl1 position index as MOD(hash(acl1), sizeof(A)), where hash(acl1) is the acl1's hash value.
2>. search for a matching ACL in the ACL linked list of array A, at position A[index].

FIG. 3

3. Pseudocode for Searching for a Matching ACL by Comparing the Target ACL (acl1) with each ACL (acl2) in the Linked List at Position A[index].

1>. If the total number of rules in acl1.R and acl2.R is not equal, continue to next ACL in the linked list at position A[index].
2>. Otherwise, for each rule (r) in acl1.R of the target acl1:
3>. calculate the rule position index as MOD(hash(r), sizeof (acl1.R));
4>. search for the matching rule in the rule linked list at acl2.R[index].
5>. if match is found, go back and continue for the next rule in acl1.R.
6>. otherwise, go to top and continue comparison with next ACL in the ACL linked list at A[index].
7>. if all rules of acl1 are matched, return acl2 as the matching ACL.

FIG. 4

```
import java.util.ArrayList;

public class RMEHashtable { private ArrayList row[];
    private int count;

public RMEHashtable(int initialCapacity) {
        row = new ArrayList[initialCapacity];
        count = 0;
    } public synchronized int size() {
        return count;
    } public synchronized boolean isEmpty() {
        return count == 0;
    } public synchronized Object get(Object key) {
        Object rc = null;
        int hash = key.hashCode();
        int index = (hash & 0x7FFFFFFF) % row.length;
        if (row[index] != null) {
            Object objs[] = row[index].toArray();
            for (int i = 0; i < objs.length; i++) {
                if ((objs[i].hashCode() == hash) &&
                    objs[i].equals(key)) {
                    rc = objs[i];
                    break;
                }
            }
        }
        return rc;
    }
```

FIG. 9A

```
public synchronized void put(Object value) {
    if (value == null) {
        throw new NullPointerException();
    }

Object rc = null;
    int hash = value.hashCode();
    int index = (hash & 0x7FFFFFFF) % row.length;
    if (row[index] != null) {
        boolean bFound = false;
        Object objs[] = row[index].toArray();
        for (int i = 0; i < objs.length; i++) {
            if ((objs[i].hashCode() == hash) &&
                objs[i].equals(value)) {
                bFound = true;
                break;
            }
        }
        if (bFound) {
            return;
        } else {
            row[index].add(value);
            count++;
        }
    } else {
        row[index] = new ArrayList();
        row[index].add(value);
        count++;
    }
}
```

FIG. 9B

```
public synchronized void replace(Object value) {
    if (value == null) {
        throw new NullPointerException();
    }

Object rc = null;
    int hash = value.hashCode();
    int index = (hash & 0x7FFFFFFF) % row.length;
    if (row[index] != null) {
        boolean bFound = false;
        Object objs[] = row[index].toArray();
        for (int i = 0; i < objs.length; i++) {
            if ((objs[i].hashCode() == hash) &&
                objs[i].equals(value)) {
                    objs[i] = value;
                    bFound = true;
                    break;
            }
        }
        if (bFound) {
            return;
        } else {
            row[index].add(value);
            count++;
        }
    } else {
        row[index] = new ArrayList();
        row[index].add(value);
        count++;
    }
}
```

FIG. 9C

```
public synchronized void remove(Object key) {
    int hash = key.hashCode();
    int index = (hash & 0x7FFFFFFF) % row.length;
    if (row[index] != null) {
        Object objs[] = row[index].toArray();
        for (int i = 0; i < objs.length; i++) {
            if ((objs[i].hashCode() == hash) &&
                objs[i].equals(key)) {
                row[index].remove(i);
                count--;
                break;
            }
        }
    }
} public synchronized void clear() {
    for (int i = 0; i < row.length; i++) {
        row[i] = null;
    }
    count = 0;
} public synchronized int hashCode () {
    int hash = 0;
    for (int index = 0; index < row.length; index++) {
        if (row[index] != null) {
            Object objs[] = row[index].toArray();
            for (int i = 0; i < objs.length; i++) {
                hash += objs[i].hashCode();
            }
        }
    } return hash;
}
```

FIG. 9D

```
public synchronized boolean equals (Object o) {
    if (o instanceof RMEHashtable) {
        RMEHashtable t2 = (RMEHashtable)o;
        if (count == t2.size()) {
            for (int index = 0; index < row.length;
                index++) {
                if (row[index] != null) {
                    Object objs[] =
                        row[index].toArray();
                    for (int i = 0; i < objs.length;
                        i++) {
                        if (t2.get(objs[i]) == null)
                        {
                            return false;
                        }
                    }
                }
            }
        } else {
            return false;
        }
    } else {
        return false;
    }
    return true;
}
```

FIG. 9E

```
public synchronized String toString() {
    StringBuffer buf = new StringBuffer();
    String trailer = "";
    buf.append("RMEHashtable has " + count + "
        elements:[");
    for (int index = 0; index < row.length; index++)
    {
        if (row[index] != null) {
            Object objs[] = row[index].toArray();
            for (int i = 0; i < objs.length; i++) {
                buf.append(trailer);
                buf.append(objs[i].toString());
                if (trailer.length() == 0) {
                    trailer = ", ";
                }
            }
        }
    }
    buf.append("]");

return buf.toString();
    }
}
```

FIG. 9F

```
public class RMEACLHandler { private RMEHashtable rmeAclTable;

public RMEACLInfo findACL (RMEACLInfo target) {
        return (RMEACLInfo)rmeAclTable.get(target);
    } class RMEACLRuleInfo {
       int hash = 0;
       long privSetCode;
       String name;

RMEACLRuleInfo(String name, long privSetCode) {
          this.name = name;
          this.privSetCode = privSetCode;
          // a simple hash algorithm
          hash = (int)privSetCode*name.hashCode();
       }

// override this method for hashtable comparison
       public int hashCode () {
          return hash;
       }

// override this method for hashtable comparison
       public boolean equals (Object o) {
          RMEACLRuleInfo info2 = (RMEACLRuleInfo)o;
          if (privSetCode == info2.privSetCode) {
             return name.equals(info2.name);
          } else {
             return false;
          }
       }
    }
}
```

FIG. 10A

```
class RMEACLInfo {
   int hash = 0;
   RMEHashtable rules;

RMEACLInfo(RMEACLRuleInfo[] infos)
   {
      rules = new RMEHashtable(infos.length);
      for (int i = 0; i < infos.length; i++) {
         rules.put(infos[i]);
      } hash = rules.hashCode();
   } int size () {
      return rules.size();
   }

// override this method for hashtable comparison
   public int hashCode () {
      return hash;
   }

// override this method for hashtable comparison
   public boolean equals (Object o) {
      RMEACLInfo info2 = (RMEACLInfo)o;
      if ((hash == info2.hashCode()) && (size () ==
         info2.size())) {
         return rules.equals(info2.rules);
      } else {
         return false;
      }
   }
}
```

FIG. 10B

MATCHING OF COMPLEX NESTED OBJECTS BY MULTILEVEL HASHING

BACKGROUND OF THE INVENTION

1. Field of the Invention

This invention relates in general to database content management systems performed by computers, and in particular to a method and system for highly efficient processing, storing, searching and matching of complex nested objects, for their quick and easy retrieval.

2. Description of Related Art

Databases are computerized information storage and retrieval systems. A Relational Database Management System (RDBMS) is a database management system (DBMS) which uses relational techniques for storing and retrieving data. RDBMS software using a Structured Query Language (SQL) interface is well known in the art. The SQL interface has evolved into a standard language for RDBMS software and has been adopted as such by both the American National Standards Organization (ANSI) and the International Standards Organization (ISO).

A typical database management system includes both database files and index files. The database files store data in the rows and columns of tables stored on data pages. In such a table, the rows may correspond to individual records while the columns of the table represent attributes of the records. For example, in a customer information table of a database management system, each row might represent a different customer while each column represents different attributes of the customers, such as the name of each customer, the amount owed by each customer and the cash receipts received from each customer.

Instead of providing for direct sorting and searching of the records in the tables, the database management system relies on the index files which contain information or pointers about the location of the records in the tables stored in the database files. The index file can be searched and sorted (scanned) much more rapidly than can the database files. An index file is scanned through transactions in which criteria are stipulated for selecting records from a table. These criteria include keys which are the attributes by which the database finds the desired record or records using the index. The actions of a transaction that cause changes to recoverable data objects are recorded in a log. In database management systems all data are stored in tables on a set of data pages that are separate from the index file. A table can have one or more indexes defined on it, each of which is an ordering of keys of the row of the tables and is used to access certain rows when the keys are known.

Large database archives, such as the ones used in audio and video libraries of media and other communications industries and educational institutions, depend on content management systems and their media indexing applications to create accurate indexes in order to locate and manage the archived content. Content management systems typically manage information contained in a series of complex objects where each object may be composed of references to data elements in various database tables. Thus, data objects are aggregations of database information and, since many data objects are complex nested objects, proper indexing is critical for efficient search and management of these objects in large archives or content collections. A complex object is composed of a series of nested complex objects. When a request for such an object is received, searching through database tables or traversing data structures, such as object trees, may take many iterations. A presently-available conventional method sequentially scans a list of objects and performs sequential comparison on each element of the complex object, in a pool containing a set of such complex objects, in search for a match. This sequential comparison is performed on complex nested objects level by level, i.e., subset by subset, attribute by attribute, element by element, and for each of these nesting level elements a comparison is performed with a corresponding element of the target object. Retrieving the information associated with a complex object may require numerous database accesses to populate all fields of all elements of the nested objects within this complex object. Not only is it time consuming to retrieve the data element information from a database, but the time to compare retrieved object information with desired object information can be a very lengthy iterative process. When these elements are strings, because string comparisons are resource intensive, sequential searches are highly inefficient, especially when searching through a large list of data and repeating comparisons on each level. Therefore, this method of finding a complex nested object in a large pool can be prohibitively time consuming.

Other conventional methods of searching for an object include use of hashing methods whereby an object, such as a rule, is hashed to an integer value which determines its identification and, sometimes, its uniqueness. Next, a search routine looks for the object in a database table or a classification tree at a position determined by an index based on the integer hash value. For complex objects, such as sets, which may have many subsets and elements in each subset, the search process takes quite a long time because the integer hash value may not be unique and thus several objects with the same index may have to be searched sequentially, element by element, for the one that is a total match and having all the same elements.

Therefore, there is a need for a simple, optimized and generic method and system which can improve the manner of processing, storing, searching and matching of complex nested objects, for their quick and easy retrieval. The method should be capable of operating on any type of complex nested objects, with any level of nesting, and performing with the minimum number of string operations, thus minimizing utilization of system resources.

SUMMARY OF THE INVENTION

The foregoing and other objects, features, and advantages of the present invention will be apparent from the following detailed description of the preferred embodiments, which makes reference to several drawing figures.

One preferred embodiment of the present invention is a computer-based method which uses multilevel hashing for lookup of a complex nested object (such as an access control list), which has a plurality of nesting levels and each level has at least one element. Method stores representatives of a complex nested object in a data structure at locations determined by recursive multilevel hashing of the complex nested object elements. When needed, a match for an inputted complex nested object is determined by applying the same recursive multilevel hashing to the inputted complex nested object, as used during the storing of the complex nested object, and performing integer comparisons with hash values of the stored complex nested object.

Another preferred embodiment of the present invention is a system implementing the above-mentioned method embodiments of the present invention.

Yet another preferred embodiment of the present invention includes a computer program product embedded in any computer usable medium tangibly embodying a program of instructions executable by the computer to perform method steps of the above-mentioned method embodiments of the present invention.

BRIEF DESCRIPTION OF THE DRAWINGS

Referring now to the drawings in which like reference numbers represent corresponding parts throughout:

FIGS. 2-4 illustrate pseudocodes for lookup of a complex nested object, according to the preferred embodiments of the present invention;

FIGS. 9A-9F represent RMEHashtable.java which illustrates Java implementation of the exemplary aspects of the present invention;

FIGS. 10A-10B represent RMEACLHandler.java which illustrates Java implementation of the exemplary aspects of the present invention.

DETAILED DESCRIPTION OF THE PREFERRED EMBODIMENTS

Figure 1:
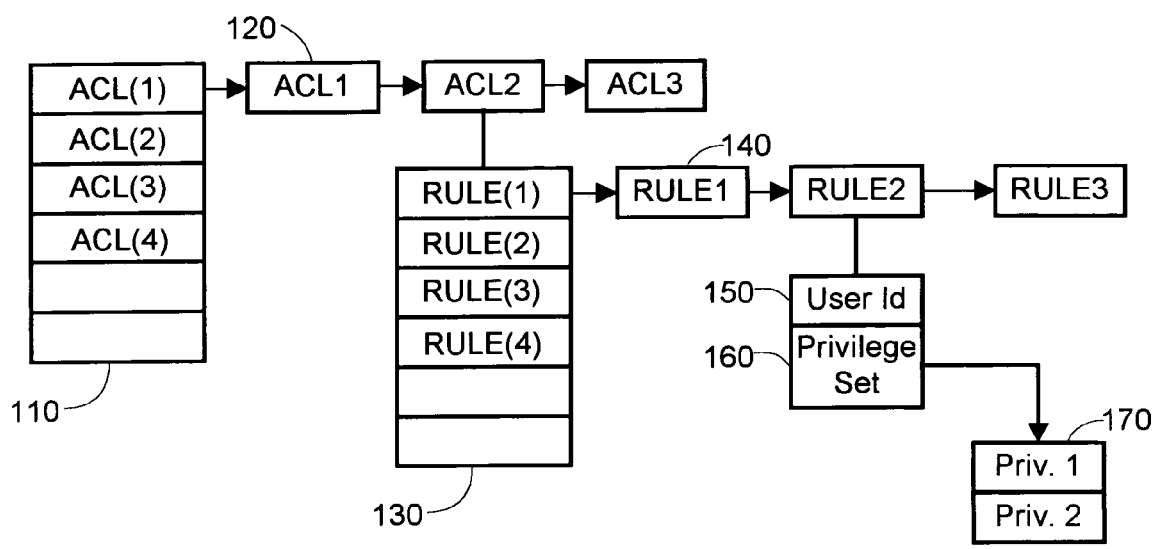
FIG. 1 illustrates data structures of an exemplary pool of access control lists, according to the preferred embodiments of the present invention.

In the following description of the preferred embodiments reference is made to the accompanying drawings, which form the part thereof, and in which are shown by way of illustration specific embodiments in which the invention may be practiced. It is to be understood that other embodiments may be utilized and structural and functional changes may be made without departing from the scope of the present invention.

The present invention discloses a system, a method and a computer program product embedded in any computer usable medium embodying a program of instructions executable by a computer to perform the method of the present invention for highly efficient lookup of a complex object having a plurality of nesting levels, where each nesting level has at least one element. The method creates a data structure composed of items used to identify the various objects embedded within the complex object. The items of this data structure may contain hash values, data identifiers, match validation data, needed to uniquely identify elements of the complex nested object, and other data, depending on the application. The data structure is preferably composed of a series of nested arrays and the items are positionally stored in the array elements. Position index calculation is based on an algorithm performing calculations on hash values obtained by a hashing algorithm. The method further allows fast retrieval of the matching existing complex nested object by performing the same hashing algorithm. Present invention uses a hashing algorithm configured to produce an integer hash value for each set of string-based elements, at every nesting level. A matching engine is configured to locate elements according to their integer hash values, using the same hashing algorithm. Thus, the matching engine of the present invention performs much more efficient integer comparisons rather than string comparisons utilized by conventional systems. However, the present invention is not limited to string-based elements and bashing can be utilized on binary representation of any data type, such as integers.

Because a complex nested object can be composed of many levels of nested objects, the data structure of containing the hash values and associated items can itself become quite large resulting in the need for many levels of searches looking for matching hash values. To speed up the search logic, additional calculations are performed on the hash values themselves to enable the elements in the data structure to be grouped into categories to limit the number of elements that must be searched. Thus, the preferred aspects of the present invention utilize a hashing algorithm which is capable of performing hashing recursively, so that hash values for each nesting level are based on hash values from the previous level. Thus, the hashing routine performs hashing of all objects at a nesting level and then calculates an overall or cumulative hash value of the nesting level and assigns it to an element on the higher nesting level. This procedure is repeated from the lowest to the highest nesting level. Therefore, the hash value of the complex nested object corresponds to an overall hash value of the object's top nesting level.

In an aspect of the present invention, complex nested objects in a database management system are composed of various elements, each referenced by a unique identifier, and hash values for all nesting levels are stored with the corresponding element identifiers, in the same data structure, which may be located within a database, memory, cache, etc. When a search for a match of a target object is requested, the method performs hashing of the target object by the same hashing algorithm performed during storing of the existing complex object's identifier and hash values and compares calculated hash values with stored hash values of the existing complex object elements to determine whether all existing elements have the same hash values as the target object elements. When a match is found, the unique identifier is used to retrieve the actual complex object from the database, memory or cache. Thus, when the hash value of an existing complex object is saved with the object identifier, within a same data structure, such as a multi-dimensional array, the method need not repeat the hashing of the existing complex object elements. Thus, hashing on each complex object can be done only once, until the complex object elements get changed.

General aspects of the present invention include a system and method for multilevel hashing of complex nested objects, allowing their efficient retrieval when they are matched with a target complex nested object. A complex nested object may have a list of attributes, each of the attributes may have a list of rules, each of the rules may have a list of privileges, each of the privileges may also be a nested object, etc. The hash value of the complex nested object is based on the object's previous nesting levels' hash values. The present invention is applicable to any type of complex nested objects with any level of nesting. One aspect of the present invention is used for ascertaining whether a database already has an object matching a target object and for obtaining its identifier. Another aspect of the present invention searches for an existing object, matching a target object, in order to allow its reuse, and only creates new objects when necessary, thus avoiding creation and management of duplicate objects.

Preferred aspects of the present invention are shown herein by an exemplary system and method used for searching a pool of records, containing Access Control Lists (ACLs), for an ACL matching a target object. When a matching ACL is found, its data can be reused. If a matching ACL is not found, a target object is added as a new ACL. These exemplary aspects are currently being implemented as EJB-based components and incorporated into the IBM® DB2 Content Manager (CM) ACL in the Host Interface Server of the IBM® DB2 Content Manager Records Manager Enabler (RME) version 8.3.

The exemplary method is used for matching a complex object that has an array of attributes, each of which is also an array of elements, i.e., a complex nested object. In this example, the ACL pool is a set of complex ACL objects, where each ACL object has a set of rules and each rule has a set of attributes. Matching an ACL with a target ACL requires matching all attributes on all levels of the ACL object. Thus, to achieve a good performance when searching for and locating a matching ACL in an existing ACL set, the preferred system and method of the present invention use a recursive hashing algorithm. The preferred hashing algorithm calculates a hash value of an ACL from the hash values of all the rules in the ACL, where the rules' hash values are based on rule attributes' hash values.

FIG. 1 illustrates the data structure of an exemplary pool of access control lists (ACLs) which are complex nested objects. The data structure is composed of a series of items created to describe the elements of the ACLs. We will refer to these items as hash objects since they contain the hash values of the objects they represent. Array A 110 has N elements, each of which is a linked list 120 of hash objects, representing the overall ACL complex nested objects, with the same position index calculated from the ACLs' overall hash value. Thus, in FIG. 1, ACL(1) is a linked list of ACL1, ACL2 and ACL3, all of which have a position index 1, i.e., they are stored in the first position of Array A. Each ACL has a list of rules defining access permission to some database records. Each nesting level of the complex object ACL has a representative set of hash objects stored in linked lists in an array. FIG. 1 illustrates that ACL2 contains an array R 130 of N elements, each of which is a linked list 140 of hash objects, representing the ACL rules nested objects, with the same position index calculated from the ACL rules' hash value. In FIG. 1, Rule(1) is a linked list stored in the first position of Array R and has a set of rules Rule1-Rule3 in the linked list 140. In this example, each rule, such as Rule2, is represented by a pair, stored as a list having a user/group ID 150 and a privilege set 160. Privilege set 160 has a list 170 of privileges, Priv1 and Priv2, associated to a user or group with a specified ID. In this example the rules define the permissible access, because an ACL is used to control user's access to an object or function, such as viewing a content, editing, etc. Each privilege may also have a set of elements, which is similarly represented and thus not shown.

In this example, an ACL in the Content Manager may be defined as:

```
{
ICMPUBLIC, ClientUserReadOnly
userA, ClientUserEdit
}
```

Thus, this exemplary ACL contains two rules, "ICMPUBLIC, ClientUserReadOnly" and "userA, ClientUserEdit". ICMPUBLIC is a name of a user group and userA is a user's name. ClientUserReadOnly and ClientUserEdit are privilege sets. Privilege sets may be defined in the Content Manager as:

ClientUserReadOnly:

```
{
ItemQuery
ClientPrint
}
ClientUserEdit:
{
ItemAdd
ItemDelete
ItemQuery
}
```

For matching purposes, two ACLs are defined as equal when: 1. each ACL contains the same number of rules, and 2. every rule in one ACL also exists in the other ACL.

Because an ACL contains a list of ACL rules and each rule contains a list of attributes, such as privileges, in order to find a matching ACL in an ACL pool, a presently-available conventional method performs sequential comparison on each rule of each ACL, and for each rule performs comparison on each privilege in the rule. Therefore, this conventional method takes a very long time to find a complex ACL in a large ACL pool.

The system and method of the present invention achieves much better performance, when searching for a matching ACL in an existing ACL set, because they perform the hashing of the ACL based on the hash values of all the rules in the ACL and places a hash object, representing the ACL, at a position whose index depends on the hash value. Further, a rule hash is determined by hashes of all the rule attributes. Thus, a hash value of one level is based on hash values of the previous level of the nested object, and so the hashing in the present invention is performed on one nesting level at the time.

Implementation of the exemplary aspects of the present invention is illustrated in FIGS. 2-8. According to the implementation of these aspects of the present invention, the existing ACLs are contained in a sparse pool of ACLs, such as a table or an array, where each ACL is saved in the pool at the position that is determined by an index calculated from the ACL's hash value. If more than one ACL has the same position index, these ACLs are placed in a linked list of blocks. After a target ACL for matching is presented in a request, locating a matching ACL in the existing ACL set of the pool is easily obtained because the pool position index is quickly calculated based on the hash value of the target ACL. Next, a target ACL is compared with each ACL from the pool's linked list having the same position index, using a matching algorithm described below. Because the pool is kept balanced, only a small number of ACL candidates exists in a linked list at each position of the pool, and, thus, the ACL comparison is quick and efficient. Therefore, in the system and method of the present invention, locating the matching ACL, if existent in the ACL set, can be done quickly. If the target ACL does not exist, it can be added to the pool quickly, to a linked list at a position index based on the target ACL's hash value.

Preferably, the ACL itself is not stored in the pool but a data structure is created with hash objects, representative of the ACL objects, containing items required to uniquely identify the ACL objects which they represent, such as object identifier, hash value and match validation data. In this case, when a match is found, the matching logic derives a unique object identifier that can be used to retrieve the actual ACL object from an external repository, such as database, if desired.

Thus, the present invention is flexible because the composition of the actual data structure is based on the needs of the application and the size of the complex object. Here, the user decides whether it is more efficient to use identifiers and keep only one object copy in the original database, from which it can be subsequently retrieved using the unique identifier once a match is determined, and not duplicate the whole object in the pool.

The system and method embodiments of these aspects of the present invention include three parts and are shown by the pseudocodes in FIGS. 2-4 and flowcharts in FIGS. 5-8. In the exemplary aspects, each ACL is represented by a linked list of rules, and each ACL's rule is saved in this linked list of rules at the position based on an index calculated from the rule's hash value. Further down the nesting levels of this complex nested object, for each ACL rule, its attributes are saved in a linked list of attributes, at the position based on an index calculated from the attribute' hash value, calculated from the privileges' hash value, etc. When matching is requested, the hash value of the target ACL is determined the same way, based on target ACL rules' hash values. During the search, when an existing ACL is found at the same index position in the pool, each ACL target rule further has to be compared with the existing ACL rule at the corresponding position, where the position is calculated by the rule hash value, because a hash value is not a unique identifier.

During matching, the matching engine of the present invention first compares overall hash values, level-by-level, starting at the highest object level. However, since hashing algorithms do not guarantee generation of unique hash values and could sometimes generate the same hash value for two or more different objects, it cannot be assumed that finding a match for the overall hash value of the complex object indicates that a matching object has been located. A matching overall hash value only indicates that there is a strong possibility that this is a match, but it is not guaranteed, and in the present invention the overall hash value match only narrows the search to a subset of objects. The narrowing is performed level-by-level to produce even smaller object set. To be certain, once a possible match is found by hash value comparisons, elements of the nested object are compared to the target object elements to determine if this is indeed a matching object. Thus, the recursive hashing of the present invention narrows the list of candidates for the detailed comparisons, instead of requiring a detailed comparison of every element of each object in the pool.

To further restrict the need for a detailed object comparison, the matching engine of the present invention performs comparisons of calculated individual element hash values element-by-element, at each nesting level. Therefore, at each nesting level of a complex nested object a comparison is made with the individual element hash value of the target object in order to avoid a detailed comparison for false matches, and a detailed comparison is only performed when all interim hash values are found to be the same. Thus, the more efficient integer comparisons are done first, at all nesting levels of the complex object, to strengthen the possibility of a true match and only upon matching of all hash values at all levels is a detailed comparison done, to validate this object to be a true match. In some applications, where the possibility of hashing conflicts is very low, it is conceivable that the detailed comparison may not be needed.

To further improve the matching process, in the present invention the detailed comparison does not have to involve comparison of every element of the nested object, and it depends on the objects and its uniqueness. To most efficiently perform this final match validation, the match validation data, needed to uniquely validate the object, are identified and/or stored in the data structure, such as pool. However, the implementation of the detailed comparison depends on the application, and the user decides upon it, since the requirements of this final validation will vary depending on the hashing algorithm used, the length of the hash value used, and the makeup of the complex nested object, all of which determine possibility of hashing conflicts. Moreover, the user chooses the object elements that will be hashed and not all object elements have to be included. Therefore, the system and method of the present invention shorten the rule comparison and, thus, the ACL comparison, because they efficiently narrow the search candidates to a very small set.

The flowcharts and pseudocode of FIGS. 2-8 depict high level flows, and the details of the actual hash calculations and matching logic are explained in detail in the text. The pseudocode of FIG. 2 creates an ACL array A, wherein each element of this array A is an empty linked list defining spaces for hash objects of all ACLs with the same position index. Array A is initialized by placing each existing ACL hash object at a position corresponding to an index based on this ACL's overall hash value. For each ACL, ACL hash object _ACL is created with array R, wherein each element of array R is an empty linked list of rule hash objects r with the same position index. Next step calculates the rule hash object position index as MOD(hash(r), size of (R)), where hash(r) is the rule's hash value, and then the rule hash object is added into the linked list of rules at position R[index]. The hash value of each rule in the ACL is calculated in this example from the rule ID and a hash value determined by hashing all the privileges from the rule privilege set. Next, the ACL hash value is calculated from all individual rules' hash values. Next step calculates the ACL position index as MOD(hash(ACL), size of (A)), where hash(ACL) is the _ACL's hash value. Then, the _ACL is added into the linked list of ACL hash objects at position A[index].

For faster access, calculated hash values of existing ACLs may be stored within the complex nested object structure itself or in a separate data structures only having object identifiers and corresponding hash values. An ACL hash value may be stored with the ACL, within the same linked list position data structure, and each rule hash value may be stored with the rule, within the same linked list position data structure. However, in other aspects of the present invention hash values of complex nested object structures are stored in a separate hash table, which may include arrays containing linked lists, and each hash value is stored with the object element identifier at a location based on the complex object nesting level and hash value.

FIG. 3 illustrates a pseudocode for locating a potential list of matching ACLs for a target ACL (acl1) in the Array A of all existing ACLs. First, it calculates the target acl1 position index as MOD(hash(acl1), size of (A)), where hash(acl1) is the acl1's hash value. Next, it searches for a matching ACL in the ACL linked list of array A, at position A[index].

FIG. 4 illustrates a pseudocode for searching for a matching ACL by comparing the target ACL (acl1) with each ACL (acl2) in the linked list at position A[index]. First, it is determined which of the ACLs in the linked list contain the same number of rules as the target ACL. If the total numbers of rules existing in the linked lists of existing object acl2.R and target object acl1.R are not equal, code continues to the next ACL in the linked list at position A[index]. Otherwise, for each rule (r) in acl1.R of the target acl1, code calculates the rule position index as MOD(hash(r), size of (acl1.R)) and searches for the match in the rule linked list at acl2.R[index]. If a match is found, the execution continues search for the next rule of acl1.R. Otherwise, execution continues by comparison of the target ACL with the next ACL in the ACL linked list at the same position A[index]. If all rules of acl1 are matched, code returns acl2 as the matching ACL. In other aspects of the present invention, only the ACL identifier is returned.

Figure 5:
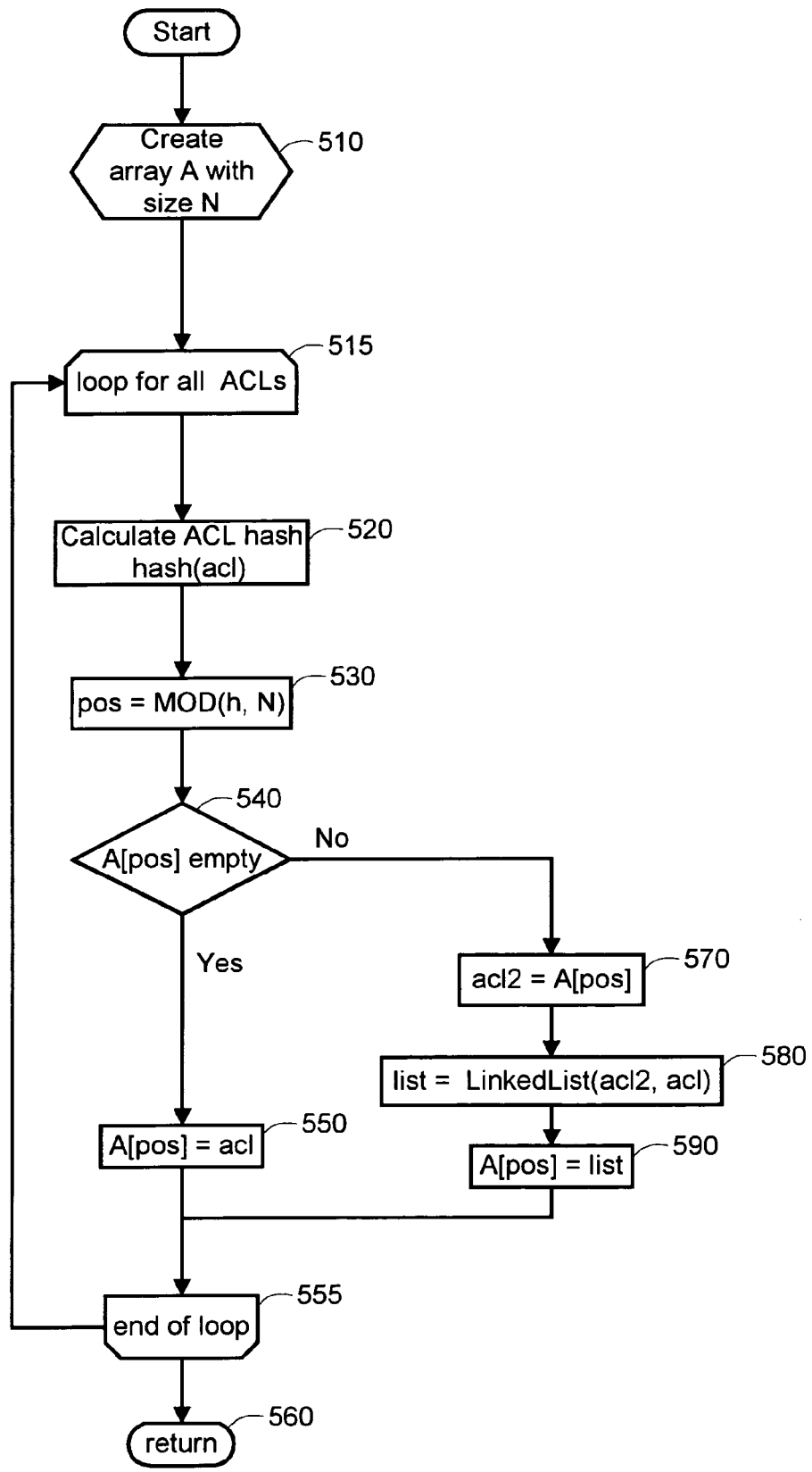
FIGS. 5-8 illustrate flowcharts for lookup of a complex nested object, according to the preferred embodiments of the present invention.

The exemplary routines represented by pseudocode in FIGS. 2-4 are shown by flowcharts in FIGS. 5-8. Although the description of FIGS. 2-11 refers to placing and storing of ACLs and rules themselves, it is not limiting and should be understood to include other aspects of the present invention where only the representatives of ACLs and rules are actually placed or stored, such as hash objects described above. FIG. 5 illustrates a flowchart of a routine which initializes an ACL array A, by placing each ACL at a position within the array which corresponds to the ACL hash value. When several ACLs have the same position index based on the calculated hash value, they are placed in a linked list which is located at the calculated position. For each ACL an acl object is created having an array (R), whose elements are empty linked lists of rules. In step 510 an ACL array is created as an array A of N elements, where each element is an empty linked list. Step 515 is a beginning of a loop, performed for each ACL (acl) from the existing ACL set. Step 520 is used to calculate a hash value (h) of an ACL. In step 530 the position of the ACL in array A is calculated as pos=MOD(h, N). In step 540, the routine checks whether this position in the array A is empty. If so, in step 550 the data for this ACL are written in the array A at the calculated position index and loop continues in step 515 until the last ACL from the set is detected, in step 555, when the routine returns, at step 560. If the position is already filled, in step 570 the content of that position of array A is temporarily stored in location acl2. In step 580 a new linked list is created as a concatenation of the list stored in acl2 and the new ACL (acl) data. In step 590 the linked list is stored in the array A at the calculated ACL position index and the loop continues for the next ACL, in step 515.

Figure 6:
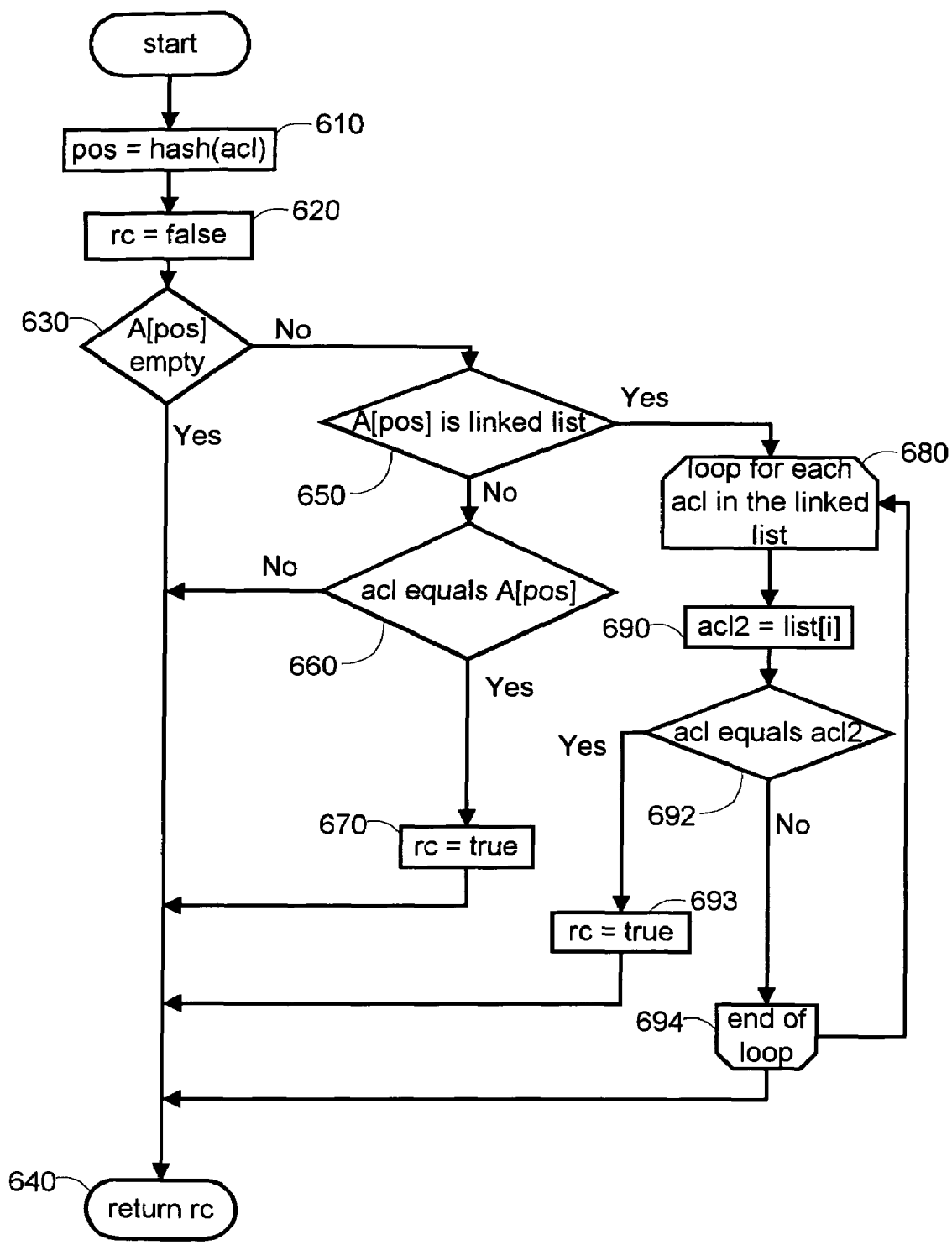

FIG. 6 illustrates a flowchart of a routine which matches a target ACL with the ACL array A of all existing ACLs. In step 610 a position index of the target ACL is calculated from the hash value hash(acl). Step 620 resets the matching flag to rc=false. Step 630 verifies whether the calculated position of array A is empty. If so, routine returns rc=false in step 640 because there is no match. If the position is not empty, in step 650 it is determined whether there is a linked list at the position of the array. If not, in step 660 it is tested whether there is a matching ACL at the position. If not found, flag rc=false is returned in step 640. If the matching ACL is found, in step 670 the matching flag is set as rc=true and returned in step 640. If it was determined, in step 650, that there is an ACL in the linked list at the position index, each ACL from the linked list is compared with the target ACL, in a loop starting at step 680. In step 690, an element of the linked list is placed in acl2 location. In step 692 it is compared with target ACL and if the match is not found the loop continues in step 694. If the matching ACL is found, in step 693 the matching flag is set as rc=true and the routine returns rc in step 640. This indicates that the ACL identifier of the matching ACL should be saved.

Figure 7:
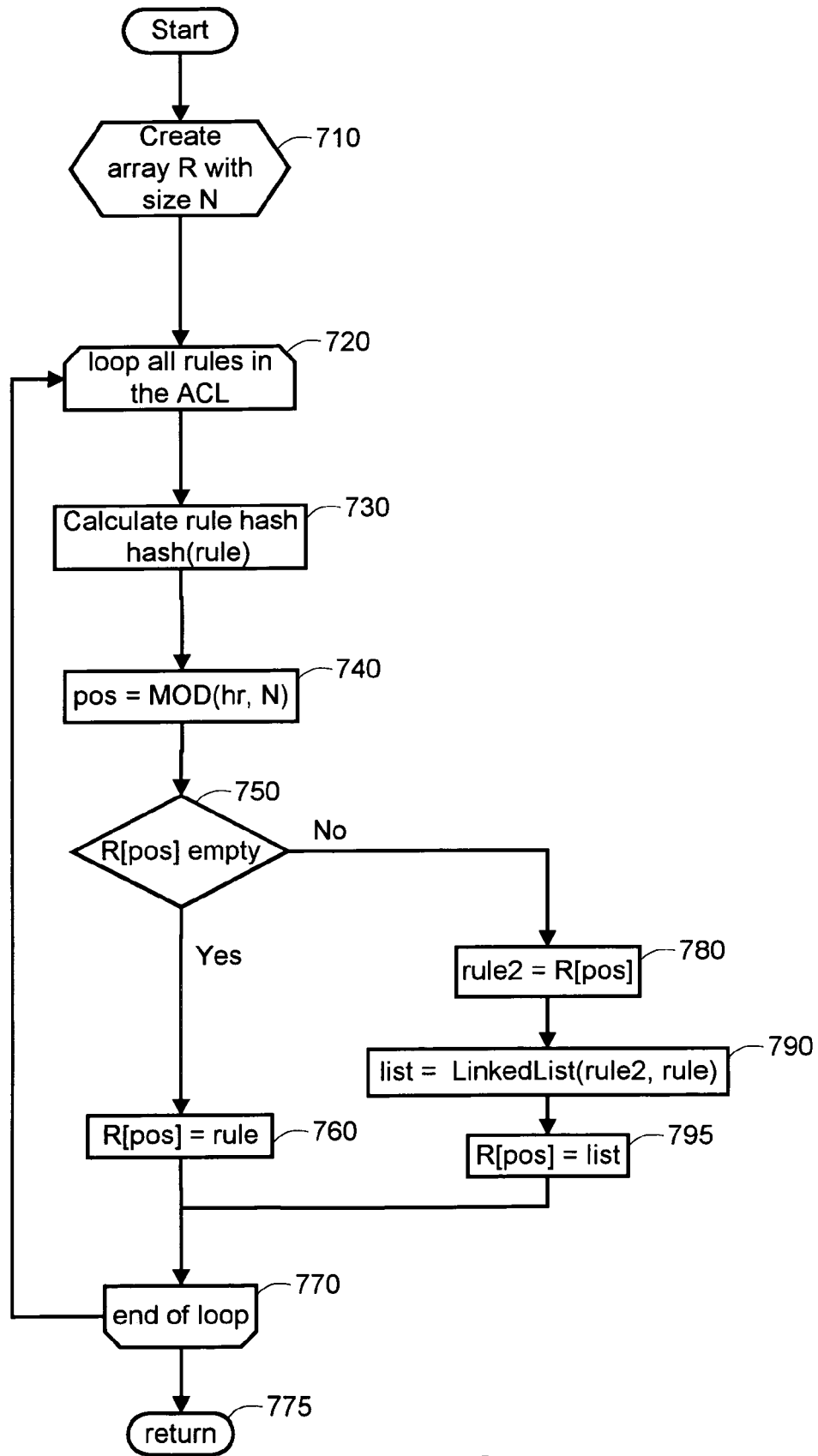

FIG. 7 illustrates a flowchart of a routine which initializes an ACL rules array R, by placing each ACL rule in a position within the array R which corresponds to the rule's hash value. When several rules of the ACL have the same position index based on the calculated hash value, they are placed in a linked list which is located at the calculated position index of array R. In step 710 an ACL rule array is created as an array R of N elements wherein each element is an empty linked list. Step 720 is a beginning of a loop, performed for each rule of the ACL (acl). Step 730 is used to calculate a hash value (hr) of the rule. In step 740 a position index of the rule in array R is calculated as pos=MOD(hr, N). In step 750, the routine checks whether this position in the array R is empty. If so, in step 760 this rule is written in the array R at the calculated position and loop continues in step 770 until the last ACL rule is detected in step 770, when the routine returns, at step 775. If the position is already filled, in step 780 the content of that position of array R is temporarily stored in location rule2. In step 790 a new linked list is created as a concatenation of the list stored in rule2 and the new rule. In step 795 the linked list is stored in the array R at the calculated rule position index and the loop continues for the next rule, in step 720.

Figure 8:
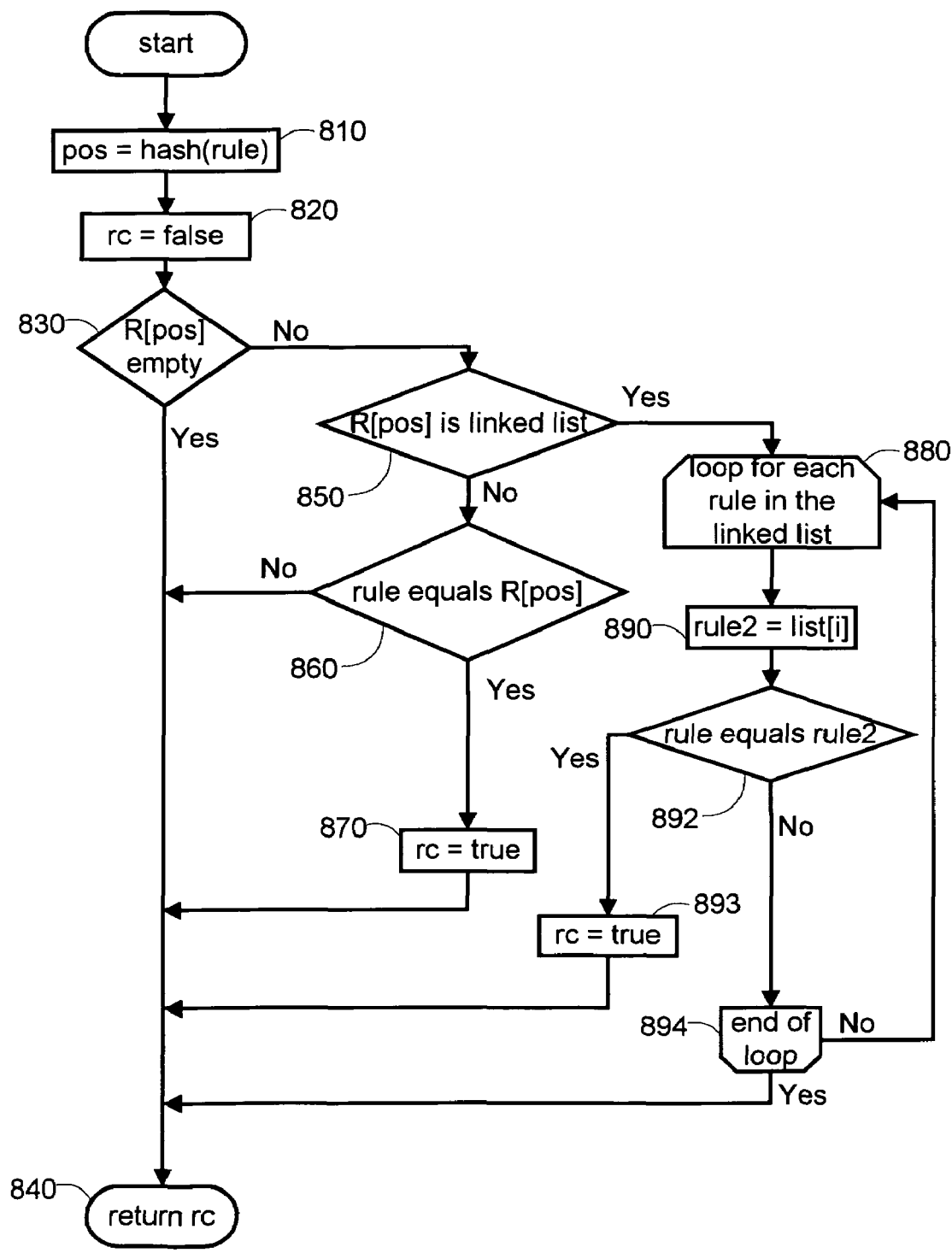

FIG. 8 illustrates a flowchart of a routine which matches a rule from a target ACL with elements of rule array R, having all existing rules of an ACL. In step 810 a position index of the target ACL rule is calculated as based on rule's hash value hash(rule). Step 820 performs a reset of the matching flag to rc=false. Step 830 verifies whether the calculated position of array R is empty. If so, flag rc=false is returned in step 840 because there is no match. If the position is not empty, in step 850 it is determined whether there is a linked list at the position index of the array R. If not, in step 860 it is tested whether there is a matching rule at the position. If not found, flag rc=false is returned in step 840. If the rule is found, in step 870 the matching flag is set as rc=true and returned in step 840. If it was determined, in step 850, that there is a linked list at the position, each linked list's rule is compared with the target ACL rule, in a loop starting at step 880. In step 890, a rule element of the linked list is placed in rule2 location. In step 892 it is compared with the target rule and if the match is not found the loop continues in step 894. If the match is found, in step 893 the matching flag is set as rc=true and the routine returns rc in step 840. This indicates that the rule identifier of the matching rule should be saved.

These exemplary aspects of the present invention are further extended accordingly, for deeper nesting levels of the complex object ACL. Next level is an array P, having a linked list of a rule's privilege set. For each rule privilege, a position index is calculated from the privilege hash value. A routine initializes a rule privileges array, by placing each privilege in a position within the array which corresponds to the privilege position index. There is also a routine which matches a privilege from an target ACL with the elements of the rule privileges array of the existing privileges of the ACL rule. These routines perform similarly to routine of FIGS. 7-8 and are thus not shown.

FIGS. 9A-9F and FIGS. 10A-10B illustrate Java implementation of the exemplary aspects of the present invention described above. FIGS. 9A-9F represent RMEHashtable.java and FIGS. 10A-10B represents RMEACLHandler.java. The present invention can be utilized in any programming language and use any hashing method. The exemplary hashing algorithm of FIGS. 9A-9F and FIGS. 10A-10B produces an integer hash value for each string-based element, derived from the string content by converting each character of a string to an integer. The position index of an element within an array is obtained as a remainder of the modulo function performed on a hash value and the array size. For the higher nesting levels, after the first level, modulo function is performed on a hash value representing a combination of hash values from the previous nesting level, which may be a sum of hash values from the previous nesting level.

In these exemplary embodiments arrays are declared as hash tables, which are data structures which map objects to their hash values and allow efficient lookup of the object value associated with a given hash value. The exemplary embodiments use a set of Java routines and Java declarations. Rows of hash tables are linked lists, declared as Arraylists. Routine ToArray copies elements of an array and routine ToString returns a string representing a value of an object. Add routine populates an Arraylist. Size and Count routines return number of elements in an Arraylist. Get routine finds a match for an object, a Put routine adds an object to the data structure, a Replace routine replaces a value, and a Remove routine deletes an object/value pair association. In Java, a routine "static Boolean equals" returns a true value when compared arrays have the same length and the elements at corresponding indexes match.

Figure 11:
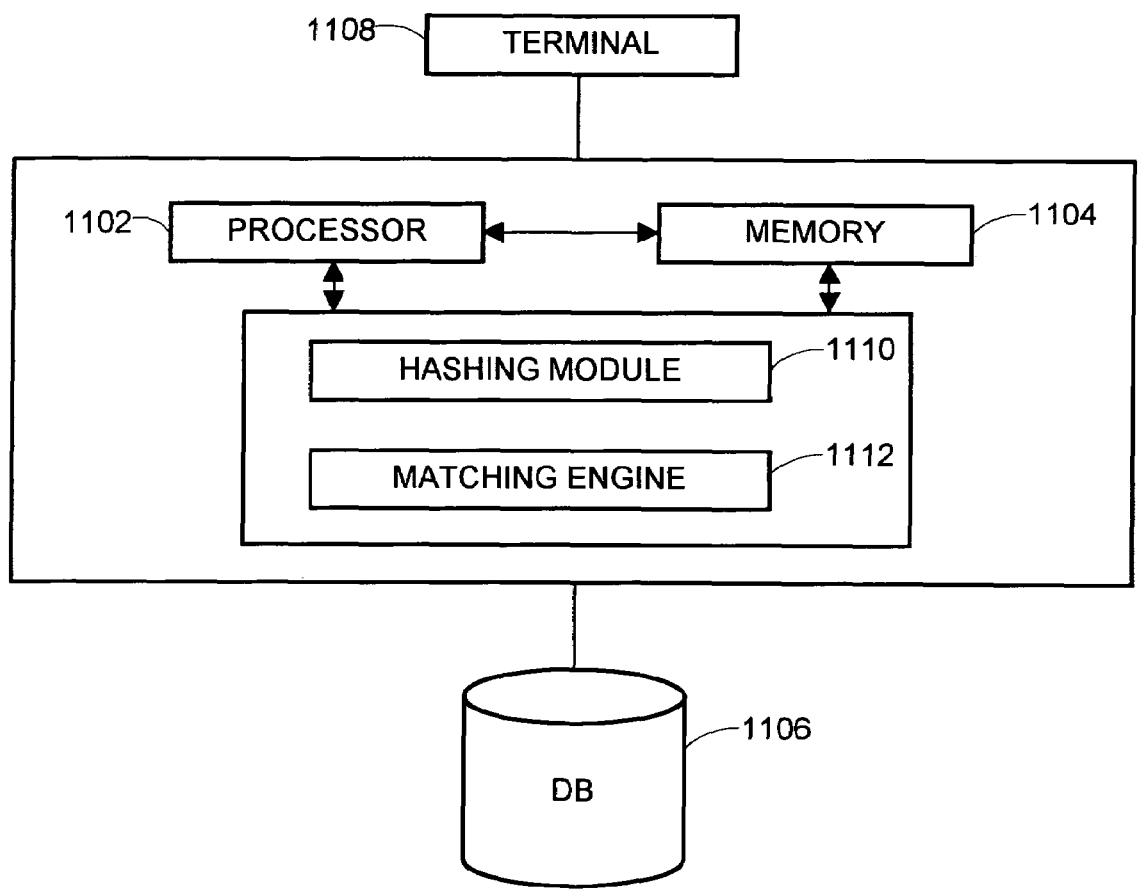
FIG. 11 illustrates a hardware and software environment enabling fast lookup of a complex nested object, according to the preferred embodiments of the present invention.

The present invention can be realized in hardware, firmware or software, any combination of hardware, firmware and software, or in any other process capable of providing the disclosed functionality. Implementation of the method and system of the present invention can be realized in a centralized fashion in one computer system, or in a distributed fashion where different elements are spread across several interconnected computer systems. Any type of computer system or apparatus adapted for carrying out the methods described herein is suited to perform the functions described herein. FIG. 11 illustrates a general purpose computer system with a group of computer programs which, when being loaded and executed, control the computer system in such a way that it carries out the method aspects of the present invention. The computer programs can be embedded in a computer program product embedded in any computer usable medium which comprises all the features enabling the implementation of the methods described herein and which are able to carry out these methods when loaded in a computer system.

In the exemplary environment of FIG. 11, a computer system is comprised of one or more processors 1102 with computer memory 1104, connected to one or more electronic storage devices 1106, such as disk drives, that store one or more relational databases. These drives may comprise, for example, optical disk drives, magnetic tapes and/or semiconductor memory. Operators of the computer system use a standard operator terminal interface 1108, such as IMS/DB/DC, CICS, TSO, OS/2 or other similar interface, to transmit electrical signals to and from the computer system, that represent commands for performing various search and retrieval functions, termed queries, against the databases. In the present invention, these queries conform to the Structured Query Language (SQL) standard, and invoke functions performed by Relational DataBase Management System (RDBMS) software. In the preferred embodiments of the present invention, the RDBMS software comprises the DB2 product offered by IBM® for several operating systems and can be applied to Oracle, etc. Those skilled in the art will recognize, however, that the present invention is not only vendor independent but is also applicable to any RDBMS software that uses SQL, and may similarly be applied to non-SQL queries.

Software components of the computer system of FIG. 11 include a hashing module 1110 and a matching engine 1112, according to the preferred aspects of the present invention. These software modules are connected to memory 1104 and storage devices 1106, and data structures of the present invention, such as hash tables, arrays, linked lists, etc., needed for storing and a rapid lookup of complex object having a plurality of nesting levels, where each nesting level has at least one element. Each element of the complex nested object or its representative may be stored in a data structure location determined from the element's hash value obtained by a hashing algorithm of hashing module 1110.

A target complex object can be entered by a user of the terminal 1108, from an application, an event handler of scheduled events, etc. The system uses matching engine 1112 for fast retrieval of the matching existing complex nested object by using the hashing module 1110 to perform the same hashing algorithm on each element of the target object as performed during storing of the complex objects. Hashing module 1110 of the present invention uses a hashing algorithm configured to produce an integer hash value for each element and set of elements, which may be string-based elements, at every nesting level. Matching engine 1112 is configured to locate elements according to their integer hash values, using the same hashing algorithm. Thus, the matching engine 1112 of the present invention performs integer comparisons for each element of the complex nested object, level by level. When used by the matching engine 1112, hash values may be stored with object element identifiers in the same data structure, which may be a memory object. Hash values may also be stored in linked lists to speed up searches through the hash values. Further, hash values may also be stored in a table and indexing the table hash field would allow for fast lookup. In yet another aspect, hash value is used to name the complex object so that a simple name lookup could be performed.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-based method using multilevel hashing, in a computer with a physical memory, for lookup of a complex nested object having a plurality of nesting levels, each said level having at least one element, comprising:

storing representatives of a complex nested object in a data structure at locations determined by multilevel hashing of the complex nested object elements performed recursively for each said nesting level, each said location defined by calculating a position index for each said representative of the nesting level as a modulo of hash values of the elements from the previous nesting level and the data structure size; and determining a match for an inputted complex nested object by performing the same recursive multilevel hashing on the inputted complex nested object as during storing of the complex nested object, and performing integer comparisons with hash values of the complex nested object, found at the data structure locations determined by the position index calculated from the hash values, by comparing, for each said nesting level, an overall level hash value and, if a match is found, comparing each said element hash value, wherein a complex nested object is an access control list having representatives stored in an array of linked lists, wherein a linked list storing a set of access control lists with a same position index, and wherein the access control list having a set of rules' representatives stored in an array of linked list of rules in the physical memory, where each said rule having a user identifier and a set of attributes.

2. The method according to claim 1, wherein the representatives representing each said nesting level and each said element of the complex nested object in the data structure, and wherein each said representative is chosen from the group comprising an identifier, a hash value, match validation data and the complex nested object elements.

3. The method according to claim 1, wherein the step of determining a match comprises obtaining a matching object identifier.

4. The method according to claim 1, wherein the step of determining a match, if a match was not found, further comprises a step of storing representatives of the inputted complex nested object in the data structure at locations determined by recursive multilevel hashing of the inputted complex nested object elements.

5. The method according to claim 1, wherein the data structure is chosen from the group comprising tables, arrays, hash tables, linked lists, array lists, registers and cache registers.

6. The method according to claim 1, wherein a complex nested object is an access control list of a DB2 Content Manager useable by a Host Interface Server of the DB2 Content Manager Records Manager Enabler.

7. A computer-based system using multilevel hashing, in a computer with a physical memory, for lookup of a complex nested object having a plurality of nesting levels, each said level having at least one element, comprising the means for:
    storing representatives of a complex nested object in a data structure at locations determined by multilevel hashing of the complex nested object elements performed recursively for each said nesting level, each said location defined by calculating a position index for each said representative of the nesting level as a modulo of hash values of the elements from the previous nesting level and the data structure size; and
    determining a match for an inputted complex nested object by performing the same recursive multilevel hashing on the inputted complex nested object as during storing of the complex nested object, and performing integer comparisons with hash values of the complex nested object, found at the data structure locations determined by the position index calculated from the hash values, by comparing, for each said nesting level, an overall level hash value and, if a match is found, comparing each said element hash value,
    wherein a complex nested object is an access control list having representatives stored in an array of linked lists, wherein a linked list storing a set of access control lists with a same position index, and wherein the access control list having a set of rules' representatives stored in an array of linked list of rules in the physical memory, where each said rule having a user identifier and a set of attributes.

8. The system according to claim 7, wherein the representatives representing each said nesting level and each said element of the complex nested object in the data structure and wherein each said representative is chosen from the group comprising an identifier, a hash value, match validation data and the complex nested object elements.

9. The system according to claim 7, wherein the means for determining a match comprises means for obtaining a matching object identifier.

10. The system according to claim 7, wherein the means for determining a match, if a match was not found, further comprises means for storing representatives of the inputted complex nested object in the data structure at locations determined by recursive multilevel hashing of the inputted complex nested object elements.

11. The system according to claim 7, wherein the data structure is chosen from the group comprising tables, arrays, hash tables, linked lists, array lists, registers and cache registers.

12. The system according to claim 7, wherein a complex nested object is an access control list of a DB2 Content Manager useable by a Host Interface Server of the DB2 Content Manager Records Manager Enabler.

13. A computer program product embedded in a computer usable medium of a computer with a physical memory and a database management system, tangibly embodying a program of instructions executable by the computer to perform a computer-based method using multilevel hashing for lookup of a complex nested object having a plurality of nesting levels, each said level having at least one element, compnsing:
    storing representatives of a complex nested object in a data structure at locations determined by multilevel hashing of the complex nested object elements performed recursively for each said nesting level, each said location defined by calculating a position index for each said representative of the nesting level as a modulo of hash values of the elements from the previous nesting level and the data structure size; and
    determining a match for an inputted complex nested object by performing the same recursive multilevel hashing on the inputted complex nested object as during storing of the complex nested object, and performing integer comparisons with hash values of the complex nested object, found at the data structure locations determined by the position index calculated from the hash values, by comparing, for each said nesting level, an overall level hash value and, if a match is found, comparing each said element hash value,
    wherein a complex nested object is an access control list having representatives stored in an array of linked lists, wherein a linked list storing a set of access control lists with a same position index, and wherein the access control list having a set of rules' representatives stored in an array of linked list of rules in the physical memory, where each said rule having a user identifier and a set of attributes.

14. The computer program product according to claim 13, wherein the representatives representing each said nesting level and each said element of the complex nested object in the data structure and wherein each said representative is chosen from the group comprising an identifier, a hash value, match validation data and the complex nested object elements.

15. The computer program product according to claim 13, wherein the step of determining a match comprises obtaining a matching object identifier.

16. The computer program product according to claim 13, wherein the step of determining a match, if a match was not found, further comprises a step of storing representatives of the inputted complex nested object in the data structure at locations determined by recursive multilevel hashing of the inputted complex nested object elements.

17. The computer program product according to claim 13, wherein the data structure is chosen from the group comprising tables, arrays, hash tables, linked lists, array lists, registers and cache registers.

18. The computer program product according to claim 2, wherein a complex nested object is an access control list of a DB2 Content Manager useable by a Host Interface Server of the DB2 Content Manager Records Manager Enabler.

* * * * *

UNITED STATES PATENT AND TRADEMARK OFFICE
CERTIFICATE OF CORRECTION

| | | |
|---|---|---|
| PATENT NO. | : 7,613,701 B2 | Page 1 of 1 |
| APPLICATION NO. | : 11/021689 | |
| DATED | : November 3, 2009 | |
| INVENTOR(S) | : Zhao et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 792 days.

Signed and Sealed this

Nineteenth Day of October, 2010

David J. Kappos
*Director of the United States Patent and Trademark Office*